(12) United States Patent
Chiu

(10) Patent No.: US 7,446,431 B2
(45) Date of Patent: Nov. 4, 2008

(54) MULTI-INPUT SINGLE-OUTPUT POWER CONVERTER AND METHOD THEREOF

(75) Inventor: Po-Han Chiu, Pingdung (TW)

(73) Assignee: Richtek Technology Corporation, Hsinchu (TW)

( * ) Notice: Subject to any disclaimer, the term of this patent is extended or adjusted under 35 U.S.C. 154(b) by 454 days.

(21) Appl. No.: 11/248,419

(22) Filed: Oct. 13, 2005

(65) Prior Publication Data

US 2006/0082943 A1  Apr. 20, 2006

(30) Foreign Application Priority Data

Oct. 15, 2004  (TW) .............................. 93131465 A

(51) Int. Cl.
  *H02J 1/10* (2006.01)
(52) U.S. Cl. ........................................................ 307/52
(58) Field of Classification Search .................... 307/52
  See application file for complete search history.

(56) References Cited

U.S. PATENT DOCUMENTS

| | | | | |
|---|---|---|---|---|
| 4,618,779 A | * | 10/1986 | Wiscombe | .................... 307/60 |
| 6,433,527 B1 | * | 8/2002 | Izadinia et al. | .............. 323/300 |
| 7,268,527 B2 | * | 9/2007 | Horner | ....................... 323/285 |

* cited by examiner

*Primary Examiner*—Robert L. Deberadinis
(74) *Attorney, Agent, or Firm*—Rosenberg, Klein & Lee

(57) ABSTRACT

A multi-input single-output power converter comprises several switching regulators coupled to a common output for converting separate supply voltages to an output voltage in compliance with respective modulation signals. The output voltage is compared with a first reference signal to generate an error signal, the currents of the switching regulators are sensed to generate respective sense signals, and the modulation signal of one switching regulator is determined based on the sense signal of the switching regulator, the average sense signal of all the switching regulators, a second reference signal and the error signal. Particularly, the difference between the sense signal and average sense signal is used to adjust the level of the second reference signal for the error signal to compare to determine the modulation signal.

14 Claims, 5 Drawing Sheets

US 7,446,431 B2

MULTI-INPUT SINGLE-OUTPUT POWER CONVERTER AND METHOD THEREOF

FIELD OF THE INVENTION

The present invention is related generally to a circuit and method for power conversion and more particularly, to a multi-input single-output power converter and a method thereof.

BACKGROUND OF THE INVENTION

Power supplies have been widely used in a variety of electronic devices. However, there are occasions that no single power supply may meet the requirement of a particular load in a system. To resolve this problem, multiple power converters are combined to convert multiple supply voltages to an output voltage for the load. Such combined multiple power converters are generally referred to as a "multi-input single-output power converter". In a multi-input single-output power converter, the total power is distributed over the power converters. Specifically, a load current is distributed to the power converters coupled to a common output in a predetermined manner to satisfy the specified power requirements. In the cases of SC1175 of Semtech Corporation and IRU3047 of IR Rectifier Corporation, a master-slave control architecture is utilized in a voltage-mode dual-input single-output power converter, in which a master phase power converter controls the output voltage while a slave phase power converter controls the current distribution as the above mentioned. Particularly, U.S. Pat. No. 6,150,803 to Verga describes a voltage-mode dual-input single-output power converter where sense resistors are coupled in series to the inputs of the power converters of different phases and a difference between a master current and a slave current is used to adjust an error signal of the slave power converter. However, the technique used in this art has the disadvantage of low efficiency since the currents are needed to be detected and then distributed to control the slave power converter and particularly since power dissipation of the resistors reduces efficiency of the overall power converter.

Therefore, it is desired a new control architecture of a multi-input single-output power converter.

SUMMARY OF THE INVENTION

One object of the present invention is to provide a multi-input single-output power converter and a method thereof.

According to the present invention, a multi-input single-output power converter comprises a plurality of switching regulators coupled to a common output for converting separate supply voltages to an output voltage on the common output in compliance with respective modulation signals, and an error amplifier for comparing a signal varied with the output voltage with a first reference signal to generate an error signal, wherein for each of the plurality of switching regulators, a sense circuit is comprised to sense the current thereof to generate a sense signal and the modulation signal is determined based on the sense signal, an average sense signal of all the plurality of switching regulators, a second reference signal and the error signal.

In a method for converting a plurality of separate supply voltages to an output voltage, according to the present invention, a plurality of switching regulators are coupled to a common output on which an output voltage is provided, wherein each of the plurality of switching regulators converts one of the plurality of separate supply voltages to the output voltage in compliance with a respective modulation signal, a signal varied with the output voltage is compared with a first reference signal to generate an error signal, the currents of the plurality of switching regulators are sensed to generate respective sense signals for each of the plurality of switching regulators, and each of the modulation signals is determined based on the respective sense signal, an average sense signal of all the plurality of switching regulators, a second reference signal and the error signal.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
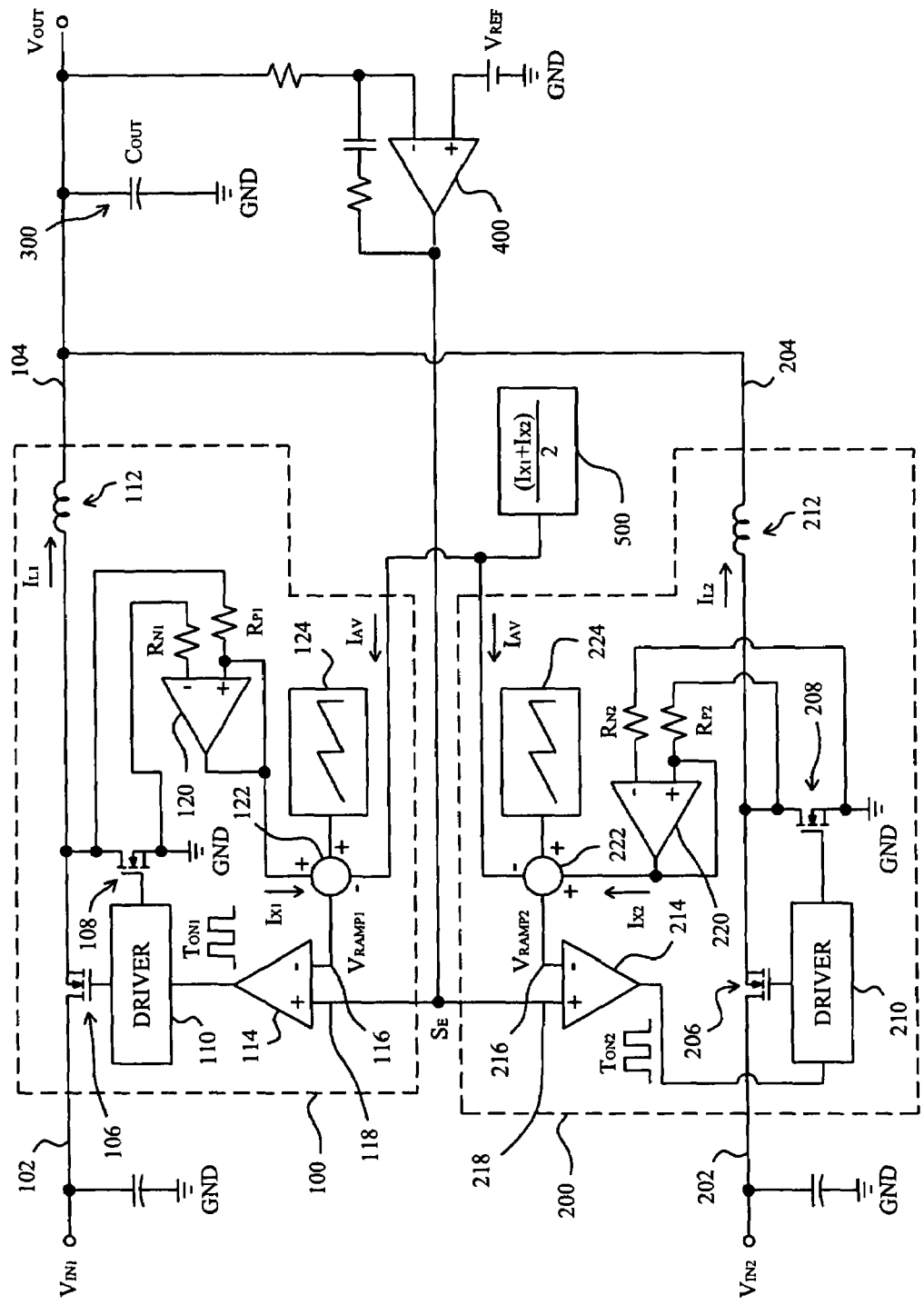
FIG. 1 shows a dual-input single-output power converter in accordance with the present invention.
Figure 2:
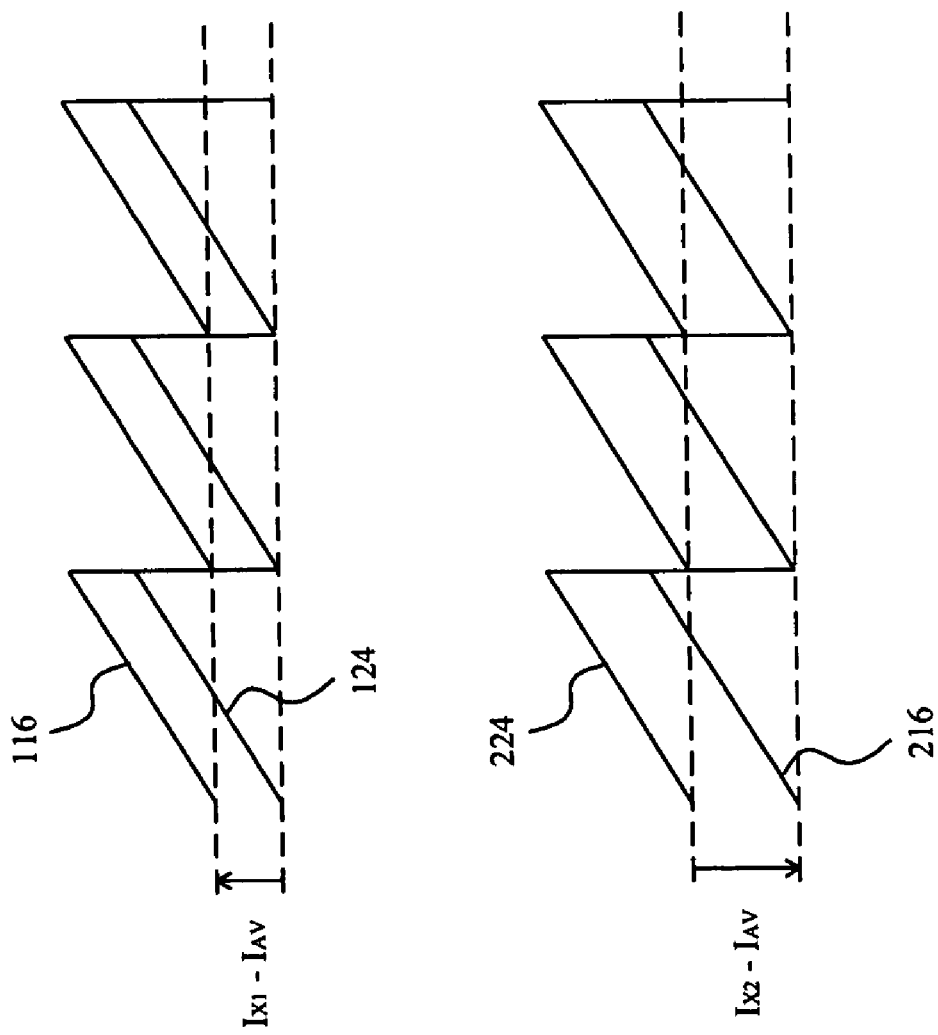
FIG. 2 shows waveforms of the ramp signals 124 and 224 in FIG. 1 and their level-shifted waveforms 124 and 224.

FIG. 1 is a dual-input single-output power converter according to the present invention, which comprises two switching regulators 100 and 200. The switching regulator 100 has its input 102 coupled with a separate supply voltage $V_{IN1}$ and output 104 coupled to common output $V_{OUT}$, to convert the supply voltage $V_{IN1}$ to output voltage $V_{OUT}$. Likewise, the switching regulator 200 has its input 202 coupled with a separate supply voltage $V_{IN2}$ and output 204 coupled to the common output $V_{OUT}$, to convert the supply voltage $V_{IN2}$ to the output voltage $V_{OUT}$. The switching regulator 100 comprises a high-side switch 106 and a low-side switch 108 coupled in series between the input 102 and ground GND, and a drive 110 to switch the high-side and low-side switches 106 and 108 in compliance with a modulation signal to produce a current $I_{L1}$ flowing through an inductor 112 to charge an output capacitor 300 to produce the output voltage $V_{OUT}$. In the switching regulator 100, a transconductive amplifier 120 is further comprised to sense the voltage drop across the low-side switch 108 by connecting its two inputs to the two ends of the low-side switch 108 with resistors $R_{P1}$ and $R_{N1}$, respectively, and generate a sense signal $I_{X1}$ in proportion to the current $I_{L1}$, a summing circuit 122 is coupled with the sense signal $I_{X1}$ and a ramp signal 124 at its two positive inputs and coupled with an average sense signal $I_{AV}$ at its negative input so that the difference between the sense signal $I_{X1}$ and average sense signal $I_{AV}$ is used to adjust the level of the ramp signal 124, and a pulse width modulation (PWM) comparator 114 compares the adjusted ramp signal $V_{RAMP1}$ with an error signal $S_E$ to generate a PWM signal having an on-time of $T_{ON1}$ for the drive 110 to switch the switches 106 and 108. On the other hand, the switching regulator 200 comprises a high-side switch 206 and a low-side switch 208 coupled in series between the input 202 and ground GND, a drive 210 to switch the high-side and low-side switches 206 and 208 in compliance with a modulation signal to produce a current $I_{L2}$ flowing through an inductor 212 to charge the output capacitor 300 to produce the output voltage $V_{OUT}$, a transconductive amplifier 220 to sense the voltage drop across the low-side switch 208 by connecting its two inputs to the two ends of the low-side switch 208 with resistors $R_{P2}$ and $R_{N2}$ respectively to generate a sense signal $I_{X2}$ in proportion to the current $I_{L2}$, a summing circuit 222 coupled with the sense signal $I_{X2}$ and a ramp signal 224 at its two positive inputs and coupled with the average sense signal $I_{AV}$ at a negative input so that the difference between the sense signal $I_{X2}$ and average sense signal $I_{AV}$ is used to adjust the level of the ramp signal 224, and a PWM comparator 214 to compare the adjusted ramp signal $V_{RAMP2}$ with the error signal $S_E$ to generate a PWM signal having an on-time of $T_{ON2}$ for the drive 210 to switch the switches 206 and 208. In this system, the error signal $S_E$ is generated by an error amplifier 400 by comparing the output voltage $V_{OUT}$ with a reference signal $V_{REF}$. In an alternative embodiment, the output voltage $V_{OUT}$ is first scaled, such as divided, and then compared with the reference signal $V_{REF}$ to generate the error signal $S_E$. The average sense signal $I_{AV}$ is provided by an average circuit 500 and generated by summing the scaled sense currents $I_{L1}$ and $I_{L2}$ or by averaging the sum of the sense currents $I_{X1}$ and $I_{X2}$. In short, the power converter shown in FIG. 1 may be deemed composed of the two regulators 100 and 200 coupled with the separate input voltages $V_{IN1}$ and $V_{IN2}$ respectively and combined to the common output $V_{OUT}$, whose on-times $T_{ON1}$ and $T_{ON2}$ are determined based on the PWM signals generated from the comparisons between the adjusted ramp signals $V_{RAMP1}$ and $V_{RAMP2}$ and the error signal $S_E$ respectively, and the two PWM signals are modulated by shifting the levels of the ramp signals 124 and 224 upwards or downwards based on the differences between the sense signals $I_{X1}$ and $I_{X2}$ and the average sense signal $I_{AV}$. The level shifts of the ramp signals 124 and 224 are shown in FIG. 2, in which the upper ramp signal 116 is obtained by shifting the ramp signal 124 upwards by an amount of $|I_{X1}-I_{AV}|$ while the lower ramp signal 216 is obtained by shifting the ramp signal 224 downwards by an amount of $|I_{X2}-I_{AV}|$.

In some alternative embodiments, the sense circuit may have different modifications. For example, the voltage drop across the high-side switch is sensed to generate the sense signal representing the current of the switching regulator, or additional sense resistor or device is coupled in series to the high-side or low-side switch for the voltage drop thereacross to be sensed to generate the sense signal representing the current of the switching regulator, or additional sense resistor or device is coupled in series to the inductor of the switching regulator for the voltage drop thereacross to be sensed to generate the sense signal representing the current of the switching regulator.

Figure 3:
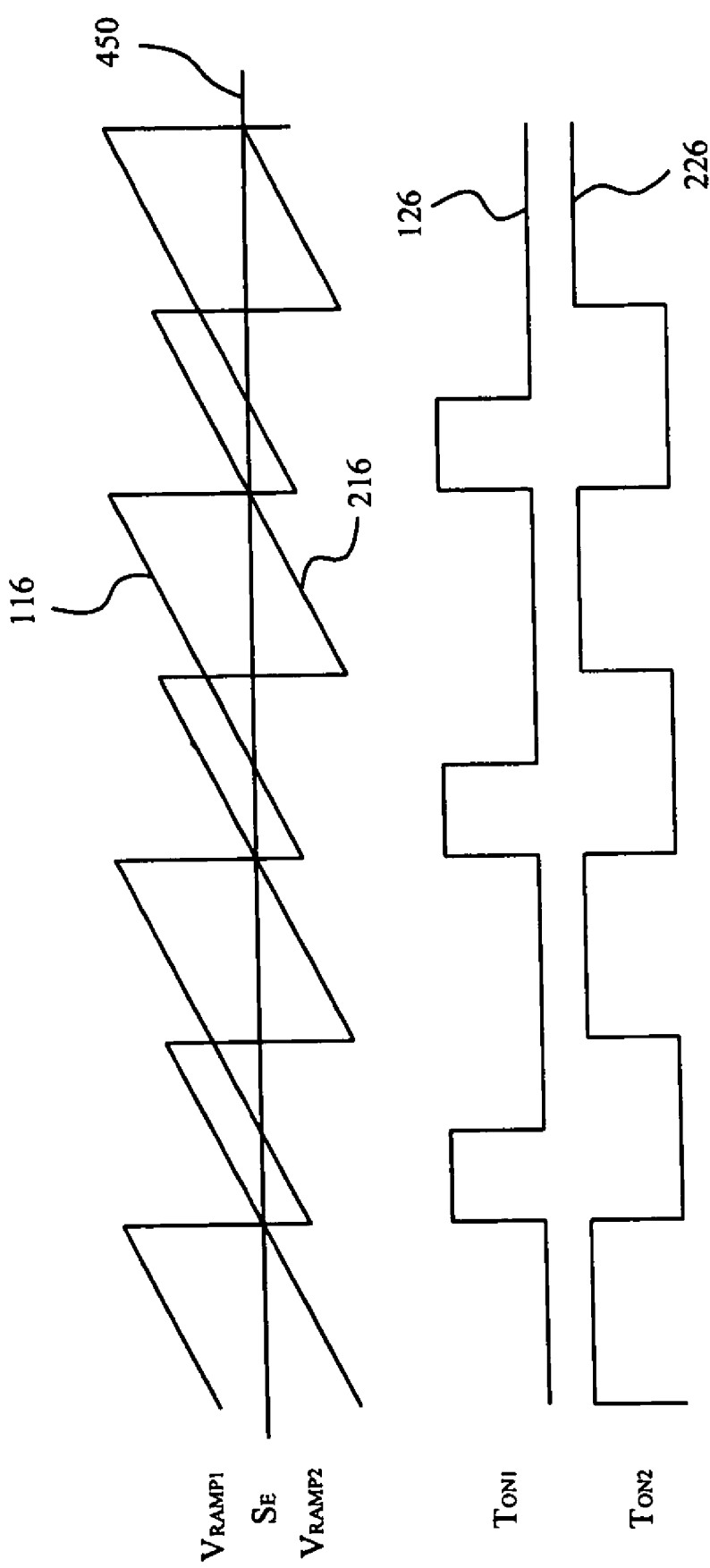
FIG. 3 is a schematic diagram illustrating the determinations of on-times $T_{ON1}$ and $T_{ON2}$ by comparing the ramp signals $V_{RAMP1}$ and $V_{RAMP2}$ in FIG. 1 with an error signal $S_E$, respectively.
Figure 4:
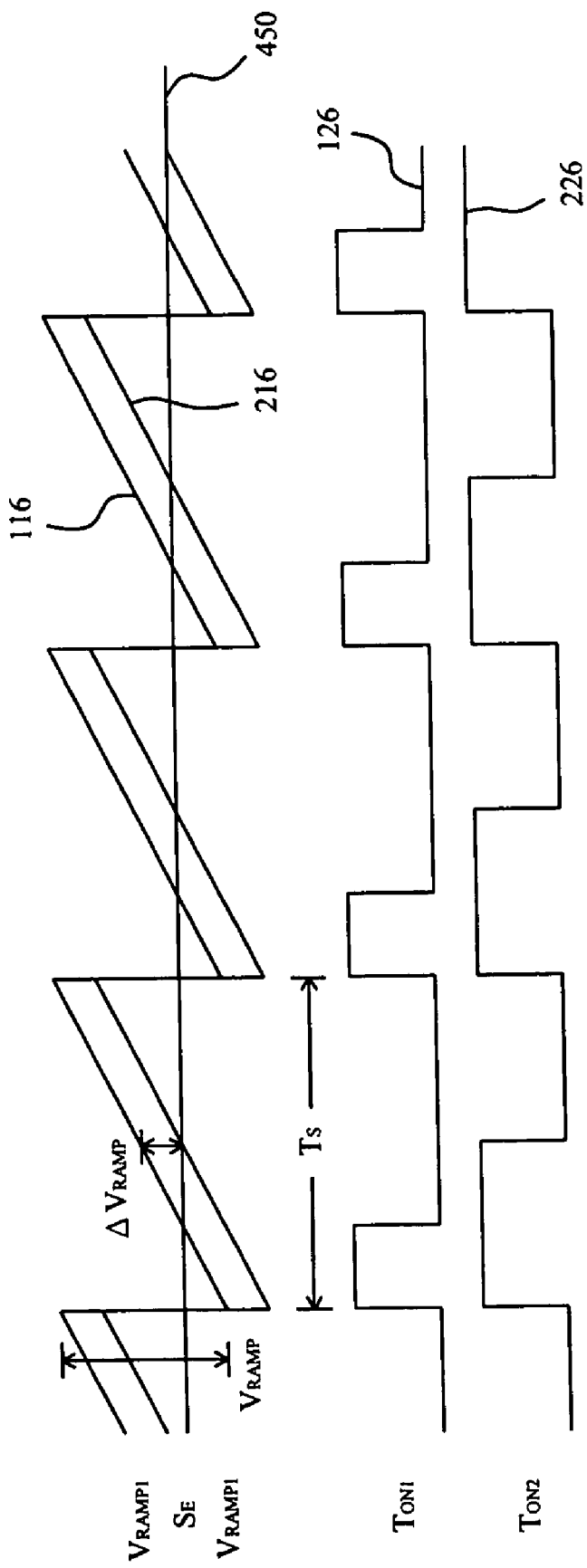
FIG. 4 shows waveforms of the ramp signal $V_{RAMP2}$ and the on-time $T_{ON2}$ of FIG. 3 after being shifted in phase for description purpose.

FIG. 3 schematically illustrates the determinations of the on-times $T_{ON1}$ and $T_{ON2}$ by comparing the ramp signals $V_{RAMP1}$ and $V_{RAMP2}$ with the error signal $S_E$ respectively, in which waveform 450 indicates the error signal $S_E$, waveform 116 represents the ramp signal $V_{RAMP1}$ shifted from the ramp signal 124, waveform 216 represents the ramp signal $V_{RAMP2}$ shifted from the ramp signal 224, waveform 126 indicates the PWM signal having the on-time of $T_{ON1}$ generated by comparing the ramp signal $V_{RAMP1}$ with the error signal $S_E$ by the PWM comparator 114, and waveform 226 indicates the PWM signal having the on-time of $T_{ON2}$ generated by comparing the ramp signal $V_{RAMP2}$ with the error signal $S_E$ by the PWM comparator 214. For description purpose, the waveforms 116 and 216 are shifted to have the same phase as shown in FIG. 4, and they have the difference $$\Delta V_{RAMP}=|D_1-D_2|\times T_S\times(V_{RAMP}/T_S), \quad [\text{EQ-1}]$$

where $T_S$ and $V_{RAMP}$ are period and amplitude of the ramp signal 124 or 224 respectively, and $D_1$ and $D_2$ are ratios of the on-times $T_{ON1}$ and $T_{ON2}$ to the period $T_S$ of the ramp signal 124 or 224 respectively, i.e., $D_1=T_{ON1}/T_S$ and $D_2=T_{ON2}/T_S$.

When the input voltages $V_{IN1}$ and $V_{IN2}$ and the output voltage $V_{OUT}$ of the power converter are given, it is obtained $$D_1=V_{OUT}/V_{IN1}, \quad [\text{EQ-2}]$$

and $$D_2=V_{OUT}/V_{IN2}. \quad [\text{EQ-3}]$$

Hence, $\Delta V_{RAMP}$ may be obtained by substituting $D_1$ shown in the equation EQ-2 and $D_2$ shown in the equation EQ-3 into the equation EQ-1.

Figure 5:
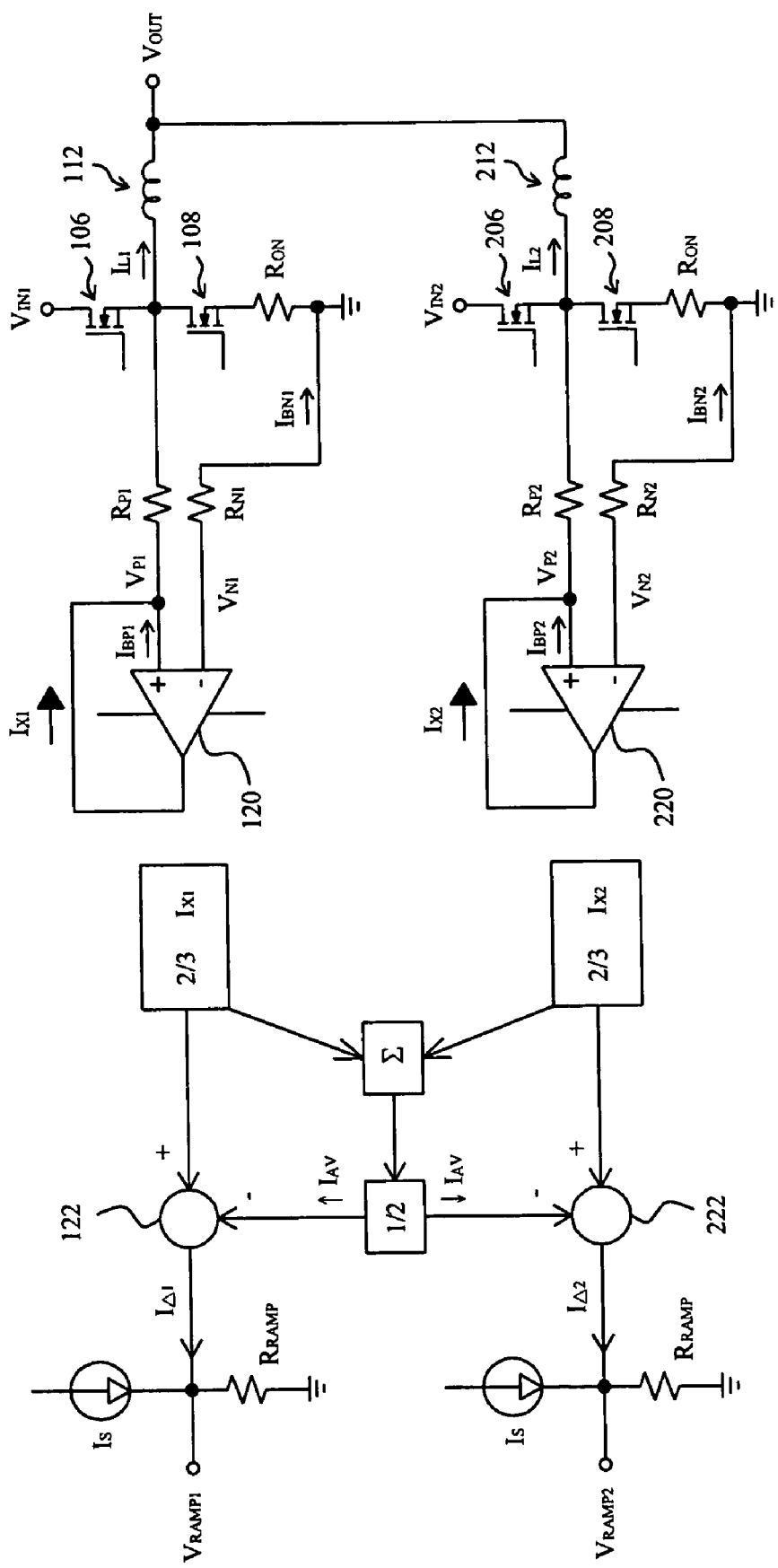
FIG. 5 is a schematic diagram taken from FIG. 1 to illustrate the principle of determining the on-times $T_{ON1}$ and $T_{ON2}$ as illustrated in FIGS. 3 and 4.

To explain the principle of determining the on-times $T_{ON1}$ and $T_{ON2}$ in more detail, a part of the circuit shown in FIG. 1 is taken and provided in FIG. 5, in which the generation of the sense signals $I_{X1}$ and $I_{X2}$ by the current sense circuits of the switching regulator 100 and 200 are illustrated at the right side thereof. The transconductive amplifier 120 is coupled to the low-side switch 108 with its two inputs through the resistors $R_{P1}$ and $R_{N1}$ respectively to sense the voltage drop across the low-side switch 108, current $I_{BP1}$ flows through the resistor $R_{P1}$, and current $I_{BN1}$ flows through the resistor $R_{N1}$. Likewise, the transconductive amplifier 220 is coupled to the low-side switch 208 with its two inputs through the resistors $R_{P2}$ and $R_{N2}$ respectively to sense the voltage drop across the low-side switch 208, current $I_{BP2}$ flows through the resistor $R_{P2}$, and current $I_{BN2}$ flows through the resistor $R_{N2}$. Assuming that each of the low-side switches 108 and 208 has an equivalent resistance $R_{ON}$, the two inputs of the transconductive amplifier 120 are $$V_{P1}=(I_{BP1}+I_{X1})\times R_{P1}-I_{L1}\times R_{ON}, \quad [\text{EQ-4}]$$

and $$V_{N1}=I_{BN1}\times R_{N1}. \quad [\text{EQ-5}]$$

When the two inputs of the transconductive amplifier 120 are identical, i.e., $V_{P1}=V_{N1}$, the current $I_{BN1}$ is equal to the current $I_{BP1}$. Now letting $I_{BIAS}=I_{BN1}=I_{BP1}$, it may be obtained from the equations EQ-4 and EQ-5 that $$I_{BIAS}\times R_{N1}=(I_{BIAS}+I_{X1})\times R_{P1}-I_{L1}\times R_{ON}, \quad [\text{EQ-6}]$$

which may be rearranged as $$I_{X1} = \frac{(R_{N1}-R_{P1})}{R_{P1}} \times I_{BIAS} + \frac{I_{L1}\times R_{ON}}{R_{P1}} \quad [\text{EQ-7}]$$
$$= \left(\frac{R_{N1}}{R_{P1}}-1\right) \times I_{BIAS} + \frac{I_{L1}\times R_{ON}}{R_{P1}}.$$

Similarly, when the two inputs of the transconductive amplifier 220 are identical, i.e., $V_{P2}=V_{N2}$, the current $I_{BN2}$ is equal to the current $I_{BP2}$. Now letting $I_{BIAS}=I_{BN2}=I_{BP2}$, it may be obtained $$I_{X2} = \frac{(R_{N2}-R_{P2})}{R_{P2}} \times I_{BIAS} + \frac{I_{L2}\times R_{ON}}{R_{P2}} \quad [\text{EQ-8}]$$

$$= \left(\frac{R_{N2}}{R_{P2}} - 1\right) \times I_{BIAS} + \frac{I_{L2} \times R_{ON}}{R_{P2}}.$$

At the left side of FIG. 5, circuits related to the generation of the average sense signal $I_{AV}$ and the adjustment of the ramp signals 124 and 224 are shown. In the case when the sense signals $I_{X1}$ and $I_{X2}$ are scaled to ⅔, from the currents (⅔)$I_{X1}$ and $I_{AV}$ the summing circuit 122 generates a current $$I_{\Delta 1} = (2/3) \times I_{X1} - I_{AV}. \quad [\text{EQ-9}]$$

Since the current $I_{AV}$ is ⅔ times the average of the currents $I_{X1}$ and $I_{X2}$, the equation EQ-9 may be rewritten as $$I_{\Delta 1} = (2/3) \times I_{X1} - (1/2) \times (2/3) \times (I_{X1} - I_{X2}) \quad [\text{EQ-10}]$$

$$= (1/3) \times (I_{X1} - I_{X2}).$$

Similarly, from the currents (⅔)$I_{X2}$ and $I_{AV}$ the summing circuit 222 generates a current $$I_{\Delta 2} = (1/3) \times (I_{X2} - I_{X1}). \quad [\text{EQ-11}]$$

The adjusted ramp signals $V_{RAMP1}$ and $V_{RAMP2}$ are a product of the current $I_{\Delta 1}$ and resistor $R_{RAMP}$ and a product of the current $I_{\Delta 2}$ and resistor $R_{RAMP}$, respectively; namely, $$V_{RAMP1} = I_{\Delta 1} \times R_{RAMP}, \quad [\text{EQ-12}]$$

and $$V_{RAMP2} = I_{\Delta 2} \times R_{RAMP}. \quad [\text{EQ-13}]$$

From the equations EQ-12 and EQ-13, it is obtained the voltage difference $$\Delta V_{RAMP} = |V_{RAMP1} - V_{RAMP2}| \quad [\text{EQ-14}]$$

$$= |I_{\Delta 1} - I_{\Delta 2}| \times R_{RAMP}.$$

By substituting the equation EQ-1 into the equation EQ-14, it is obtained $$|D_1 - D_2| = |I_{\Delta 1} - I_{\Delta 2}| \times (R_{RAMP}/V_{RAMP}) \quad [\text{EQ-15}]$$

By substituting the equations EQ-10 and EQ-11 into the equation EQ-15, it is obtained $$|D_1 - D_2| = |(\tfrac{2}{3}) \times (I_{X1} - I_{X2})| \times (R_{RAMP}/V_{RAMP}). \quad [\text{EQ-16}]$$

By substituting the equations EQ-7 and EQ-8 into the equation EQ-16, it is obtained $$|D_1 - D_2| = \quad [\text{EQ-17}]$$
$$\frac{R_{RAMP}}{V_{RAMP}} \times \frac{2}{3} \left| \left(\frac{R_{N1}}{R_{P1}} - \frac{R_{N2}}{R_{P2}}\right) \times I_{BIAS} + \left(\frac{I_{L1} \times R_{ON}}{R_{P1}} - \frac{I_{L2} \times R_{ON}}{R_{P2}}\right) \right|$$

Now letting $$|D_1 - D_2| = \frac{R_{RAMP}}{V_{RAMP}} \times \frac{2}{3} \left| \left(\frac{R_{N1}}{R_{P1}} - \frac{R_{N2}}{R_{P2}}\right) \times I_{BIAS} \right|, \quad [\text{EQ-18}]$$

then $$\frac{I_{L1} \times R_{ON}}{R_{P1}} = \frac{I_{L2} \times R_{ON}}{R_{P2}}. \quad [\text{EQ-19}]$$

Based on the equation EQ-18, it may obtain the value $|D_1 - D_2|$, i.e., the on-time difference $(T_{ON1} - T_{ON2})$, by selecting the ratios of the resistor $R_{N1}$ to the resistor $R_{P1}$ and the resistor $R_{N2}$ to the resistor $R_{P2}$, respectively, and further to determine the difference $\Delta V_{RAMP}$. From the equation EQ-19, it is shown that the current distribution $(I_{L1}/I_{L2})$ of the switching regulators in a multi-input single-output power converter is proportional to the ratio of the input resistances $(R_{P1}/R_{P2})$ of the sense circuit. Therefore, the current distribution $(I_{L1}/I_{L2})$ may be designated by adjusting the used resistors $R_{P1}$ and $R_{P2}$. Letting the currents $I_{L1}$ and $I_{L2}$ are $$\frac{n}{n+1} \Delta I_{OUT} \quad \text{and} \quad \frac{1}{n+1} \Delta I_{OUT}$$

respectively, the equation EQ-19 may be represented as $$\frac{R_{ON} \times \frac{n}{n+1} \Delta I_{OUT}}{R_{P1}} = \frac{R_{ON} \times \frac{1}{n+1} \Delta I_{OUT}}{R_{P2}}, \quad [\text{EQ-20}]$$

and from which, it is obtained the relationship between the resistors $R_{P1}$ and $R_{P2}$ as $$R_{P1} = n R_{P2}. \quad [\text{EQ-21}]$$

Therefore, the current distribution of $I_{L1}$ and $I_{L2}$ may be conducted according to the equation EQ-21.

The above embodiments are dedicated to descriptions of modulating the on-times $T_{ON1}$ and $T_{ON2}$ of the PWM signals by shifting the levels of the ramp signals. Further, once the ratios of the input voltages to the output voltage are determined, the relationship between the two input resistors $R_{P1}$ and $R_{P2}$ of the transconductive amplifiers 120 and 220 may be obtained through the above stated equations to achieve the function of current distribution of the switching regulators.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as string forth in the appended claims.

What is claimed is:

1. A multi-input single-output power converter for converting a plurality of separate supply voltages to an output voltage, the converter comprising:
   an error amplifier for comparing a signal varied with the output voltage with a first reference signal to generate an error signal; and a plurality of switching regulators coupled to the error amplifier and a common output, each for converting one of the plurality of separate supply voltages to the output voltage on the common output in compliance with a modulation signal, each of the switching regulators generating an output current and including therein:

a sense circuit to sense the output current generated by the switching regulator thereof to generate a sense signal, wherein the modulation signal for each switching regulator is determined in each switching regulator based on the sense signal, an average sense signal of the plurality of switching regulators, a second reference signal and the error signal.

2. The converter of claim 1, wherein the sense circuit comprises a transconductive amplifier for transforming a voltage drop across a switch in the respective switching regulator to the sense signal.

3. The convener of claim 1, wherein the sense circuit comprises:

a sense resistor coupled in series to a switch in the respective switching regulator; and a transconductive amplifier for transforming a voltage drop across the sense resistor to the sense signal.

4. The convener of claim 1, wherein the sense circuit comprises:

a sense resistor for the current of the respective switching regulator flowing therethrough to generate a voltage drop thereacross; and a transconductive amplifier for transforming the voltage drop to the sense signal.

5. The converter of claim 1, wherein the second reference signal is a ramp signal.

6. The converter of claim 1, wherein a difference between the sense signal and avenge sense signal is used to adjust a level of the second reference signal for the error signal to compare to determine the modulation signal.

7. The converter of claim 6, wherein the sense signal and second reference signal are coupled to positive inputs of an summing circuit, and the average sense signal is coupled to a negative input of the summing circuit, so as to generate the adjusted second reference signal.

8. The convener of claim 1, wherein the error signal and average sense signal are coupled to a non-inverting input of a PWM comparator, and the sense signal and second reference signal are coupled to an inverting input of the PWM comparator, so as to generate a PWM signal for serving as the modulation signal.

9. A method for converting a plurality of separate supply voltages to an output voltage, the method comprising the steps of:

coupling a plurality of switching regulators to a common output, each of the plurality of switching regulators for converting one of the plurality of separate supply voltages to the output voltage on the common output in compliance with a modulation signal, each of the switching regulators generating an output current;

comparing a signal varied with the output voltage with a first reference signal for generating an error signal;

sensing in each of the plurality of switching regulators the output current thereof for generating a respective sense signal for each of the plurality of switching regulators; and determining in each switching regulator the modulation signal therefor based on the sense signal, an average sense signal of the plurality of switching regulators, a second reference signal and the error signal.

10. The method of claim 9, wherein the step of generating a respective sense signal comprises the steps of:

sensing a voltage drop across a switch in the respective switching regulator; and transforming the voltage drop to the respective sense signal.

11. The method of claim 9, wherein the step of generating a respective sense signal comprises the steps of:

sensing a voltage drop across a sense resistor coupled in series to a switch in the respective switching regulator; and transforming the voltage drop to the respective sense signal.

12. The method of claim 9, wherein the step of generating a respective sense signal comprises the steps of:

generating a voltage drop across a sense resistor by flowing the current of the respective switching regulator trough the sense resistor; and transforming the voltage drop to the respective sense signal.

13. The method of claim 9, wherein the step of determining a respective modulation signal for each of the plurality of switching regulators comprises the steps of:

adjusting a level of the second reference signal based on a difference between the respective sense signal and avenge sense signal; and comparing the error signal with the adjusted second reference signal for generating the respective modulation signal.

14. The method of claim 9, wherein the step of determining a respective modulation signal for each of the plurality of switching regulators comprises the steps of:

coupling the error signal and average sense signal to a non-inverting input of a PWM comparator, and the sense signal and second reference signal to an inverting input of the PWM comparator for generating a respective PWM signal; and producing the respective modulation signal from the respective PWM signal.

* * * * *